Jan. 22, 1963     C. R. BOLLER     3,074,595

CARTON UNSTACKING MACHINE

Original Filed Sept. 26, 1957     8 Sheets-Sheet 1

INVENTOR.
Charles R. Boller
BY John E. Stryker
Atty.

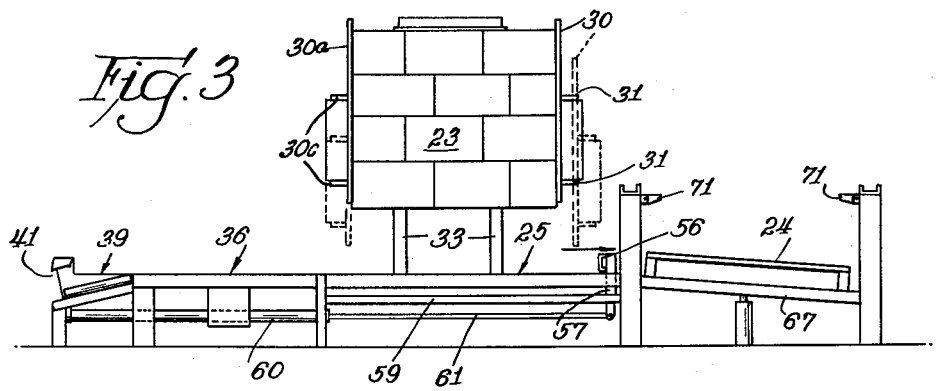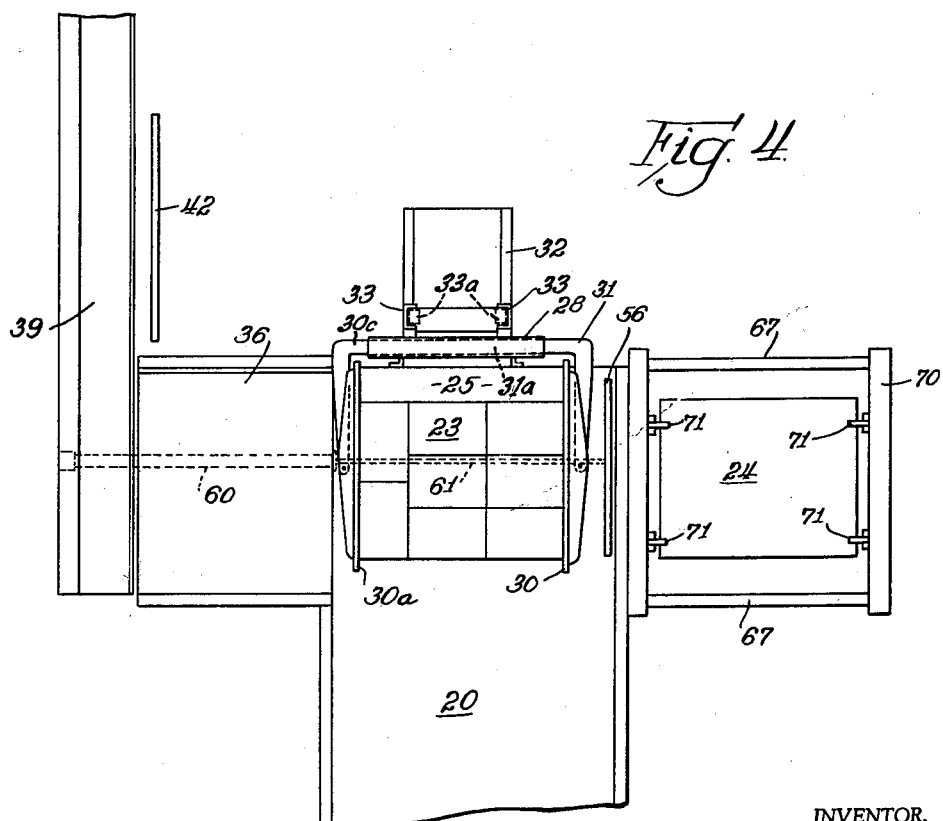

Jan. 22, 1963 C. R. BOLLER 3,074,595
CARTON UNSTACKING MACHINE
Original Filed Sept. 26, 1957 8 Sheets-Sheet 3

INVENTOR.
Charles R. Boller
BY
Atty

Jan. 22, 1963  C. R. BOLLER  3,074,595
CARTON UNSTACKING MACHINE
Original Filed Sept. 26, 1957  8 Sheets-Sheet 4
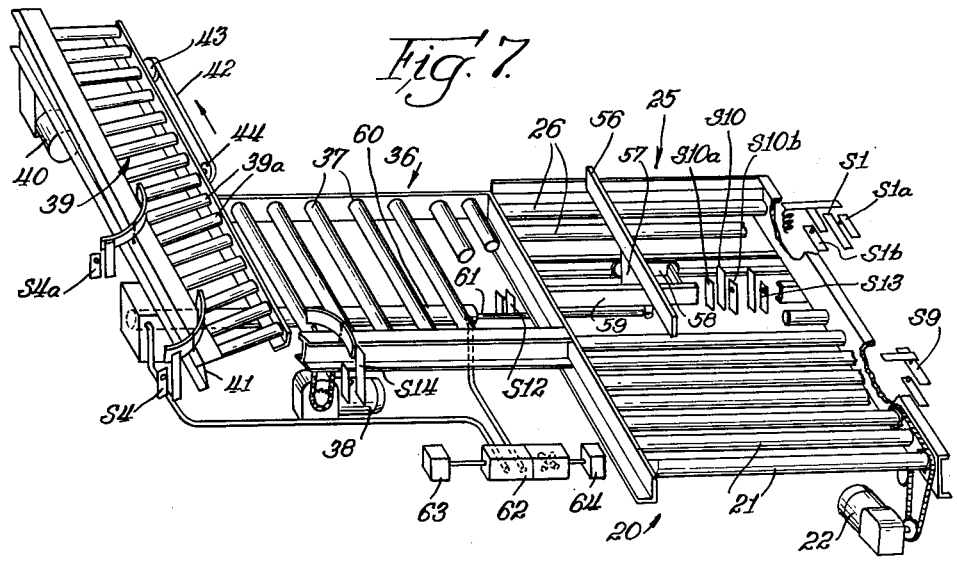
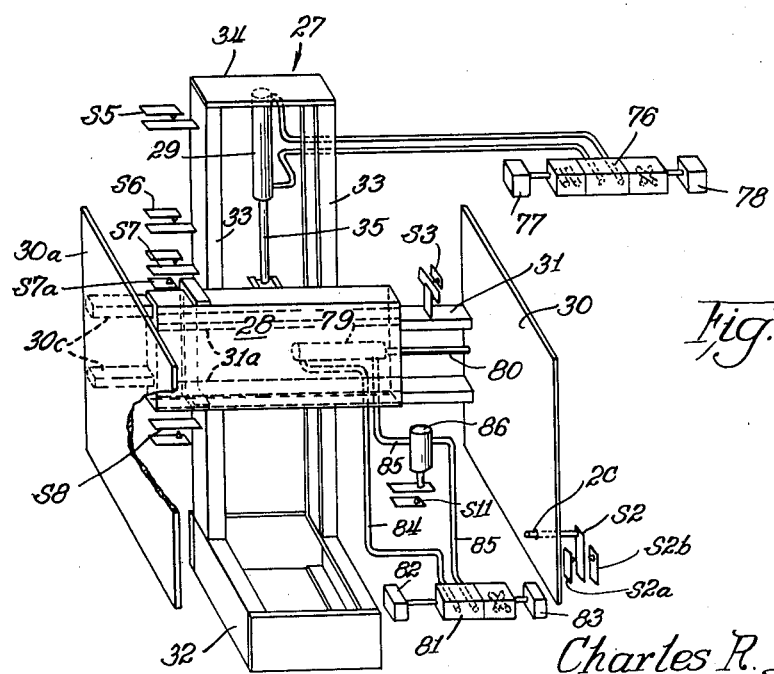
INVENTOR.
Charles R. Boller
BY John E. Stryker
Att'y.

Jan. 22, 1963  C. R. BOLLER  3,074,595
CARTON UNSTACKING MACHINE
Original Filed Sept. 26, 1957  8 Sheets-Sheet 5

INVENTOR.
Charles R. Boller
BY
Atty.

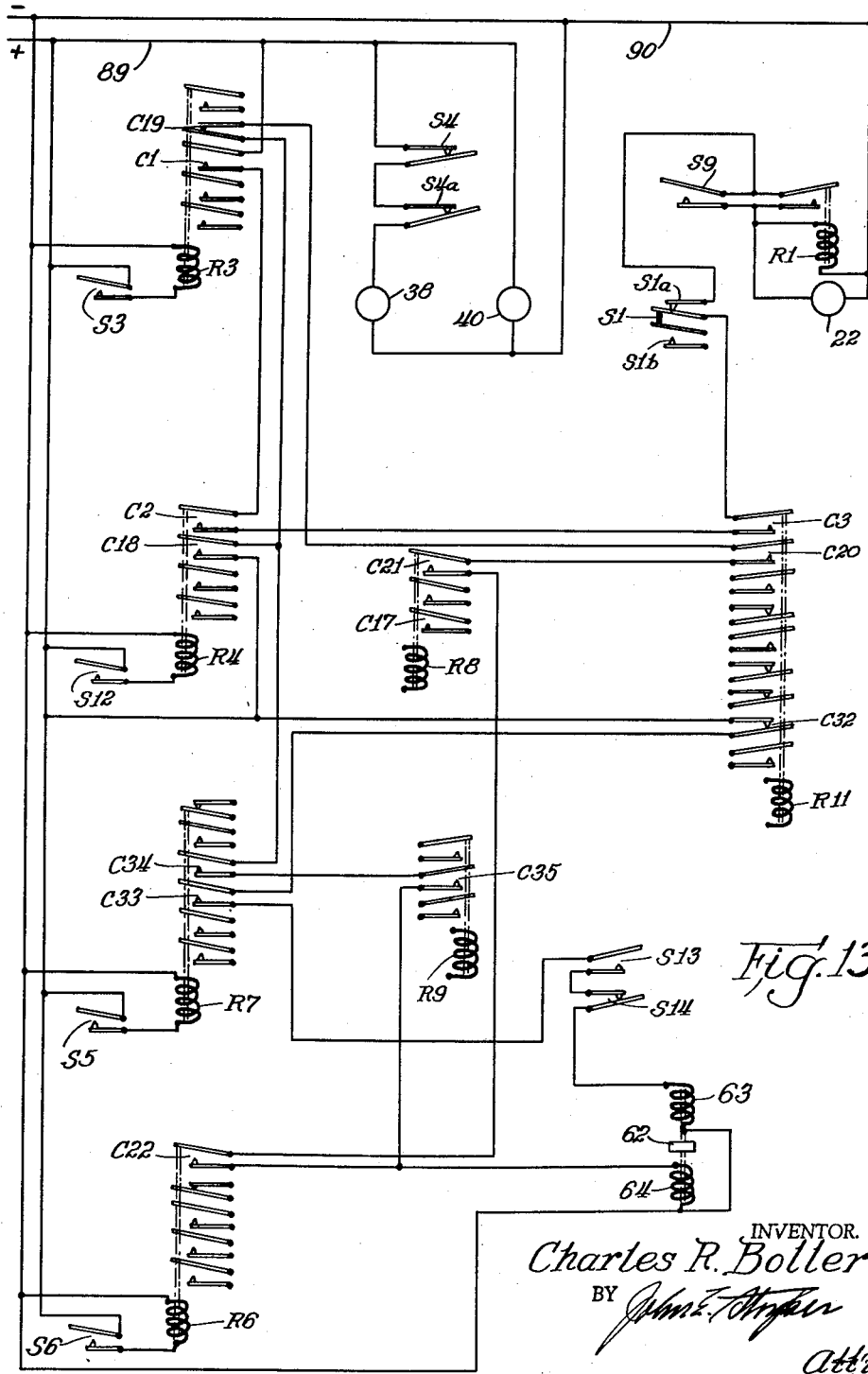

United States Patent Office 3,074,595
Patented Jan. 22, 1963

3,074,595
CARTON UNSTACKING MACHINE
Charles R. Boller, St. Paul, Minn., assignor to Standard Conveyor Company, St. Paul, Minn., a corporation of Minnesota
Original application Sept. 26, 1957, Ser. No. 686,431. Divided and this application Feb. 20, 1959, Ser. No. 795,312
9 Claims. (Cl. 221—221)

This invention relates to improvements in machines for automatically unstacking cartons, e.g., packages, cases or other units that are received in the form of a succession of stacks and for delivering the individual cartons to a conveyor or otherwise disposing of them, as individual units. For convenience of reference all of such units are herein referred to as "cartons."

Many types of goods, for example, packaged foods and bottled beverages are stored in cartons and the latter are stacked in tiers. Each stack is often supported on a pallet, skid or other portable platform in a warehouse. Such stacks of cartons must be disassembled or unstacked when the stored goods are to be sold, distributed, used or otherwise disposed of.

It is an object of this invention to provide an unusually simple, compact and reliable machine adapted to automatically unstack cartons received in stacks and delivered to the unstacking mechanism either on pallets or by a lift truck provided with clamp attachment without pallets.

Another object is to provide a machine of the class described adapted to receive stacks wherein the individual cartons are disposed in various positions in an interlocking pattern of tiers and provided with novel means for discharging the individual cartons from the machine in line and all in the same relative position.

A further object is to provide in an unstacking machine novel interlocking electrical controls affording continuous, reliable and automatic operation.

Referring to the accompanying drawings which illustrate one embodiment of my invention, by way of example and not for the purpose of limitation:

FIG. 3 is a front elevational view similar to FIG. 1 but showing the machine elements and cartons in the positions they occupy at another stage of the operation;

FIG. 4 is a plan view similar to FIG. 2 but showing the mechanism and cartons in the position shown in FIG 3;

FIG. 7 is a somewhat diagrammatic perspective view showing the principal conveyor members, pusher mechanism and associated limit switches;

FIG. 8 is a diagrammatic perspective view showing the principal limit switch controls associated with the hoist and clamping jaw mechanism, and also showing the hydraulic actuated mechanism for the hoist carriage and carton clamping jaws;

FIG. 13 is a wiring diagram showing the conveyor and pusher control circuits.

*Mechanical Construction*

Figure 1:
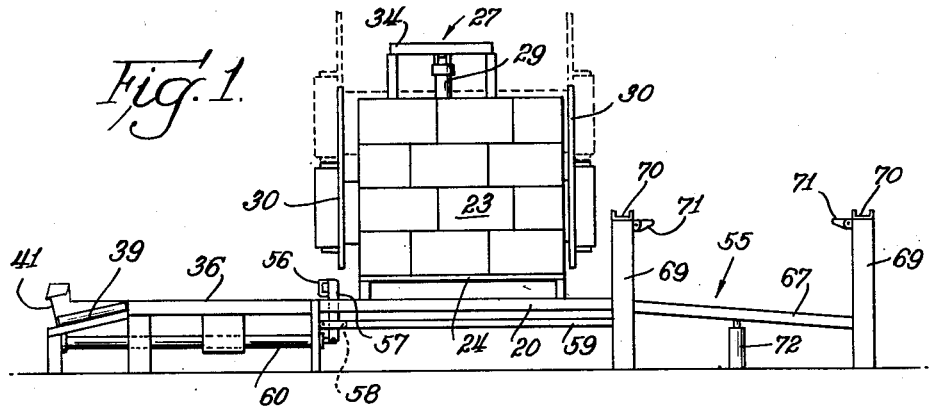
FIGURE 1 is a schematic front elevational view showing the principal mechanical elements of the machine and a stack of cartons in their positions at the start of a cycle of operation.

Stacks of cartons to be unstacked are fed to the machine on a feed conveyor 20. As indicated in FIG. 7, this conveyor is preferably of the live roller type having a series of parallel load supporting rollers 21 operatively connected to an electric motor 22 adapted to be energized periodically to feed stacks of cartons or other units referred to as "cartons" into the machine. Each stack may comprise a multiplicity of cartons 23 arranged in tiers or layers and each layer is ordinarily composed of a plurality of rows. Such stacks may be supported on a pallet 24 or, in the alternative, may be supported directly on the conveyor 20 if pallets are not required. This conveyor delivers the stacks, one at a time, to a first platform 25 defining an unstacking area. As indicated in FIG. 7, the platform 25 is preferably provided with load supporting rollers 26 extending in parallel relation to the rollers 21 of the conveyor 20.

Figure 5:
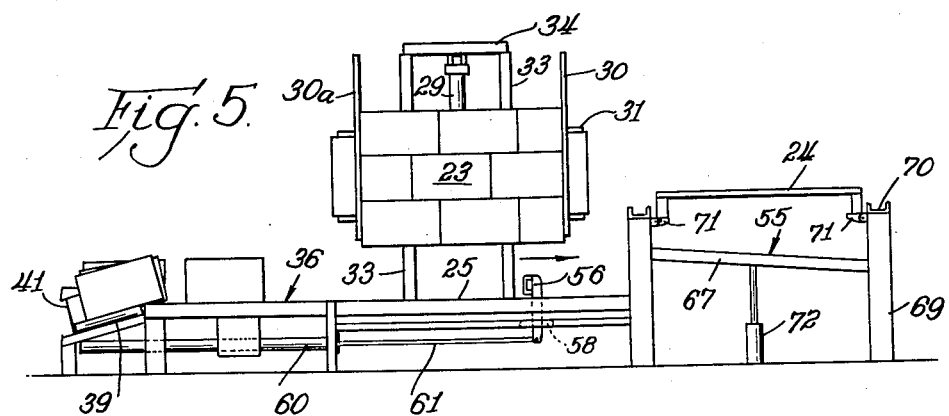
FIG. 5 is a front elevational view like FIGS. 1 and 3 but showing the mechanism and cartons in a succeeding position in the cycle of operation.
Figure 6:
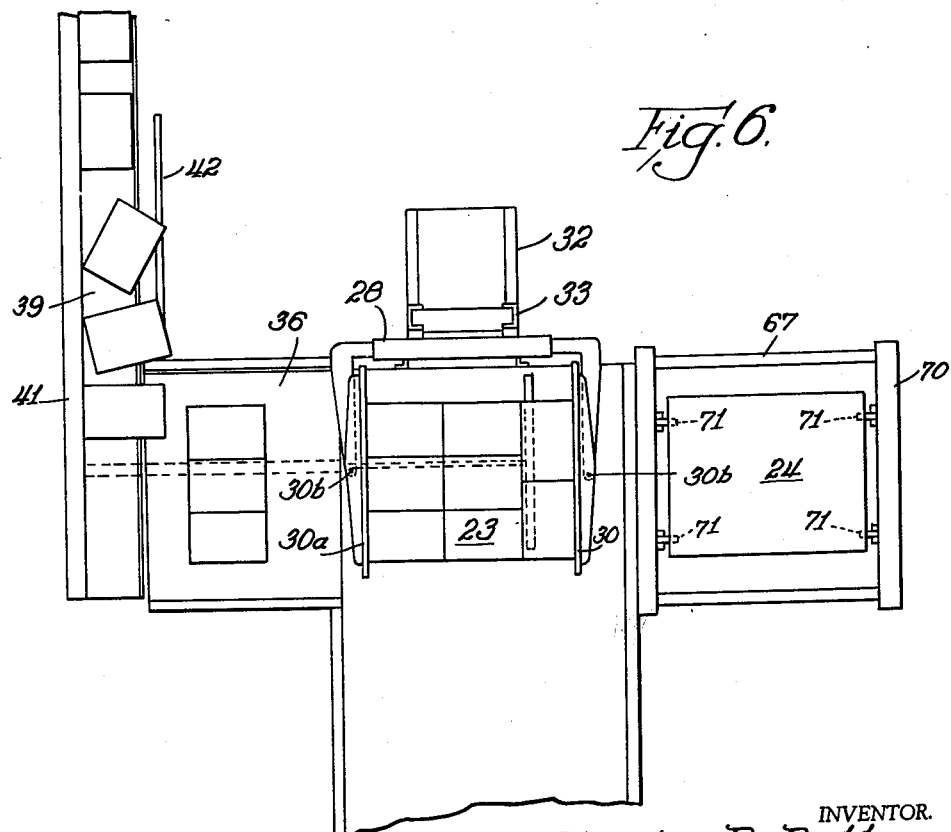
FIG. 6 is a plan view showing the mechanism and cartons in the positions corresponding to those shown in FIG. 5.

Associated with the platform 25 and projecting above it at its end opposite the conveyor 20 is a hoist indicated generally by the numeral 27. As best shown in FIG. 8, a vertically movable carriage 28 is operatively connected to hydraulic means including a cylinder 29 which is supported on the hoist frame. A pair of clamping jaws 30, 30a are mounted on the carriage 28 and have vertically disposed gripping surfaces extending in parallel relation one to the other for frictional engagement with opposite sides of one or more layers. The hoist and clamping jaws are adapted to lift a plurality of layers at a time above the platform 25, as indicated in FIGS. 3 and 5. The jaw 30a is mounted on a pair of horizontally extending arms 30c which are attached to and carried by the carriage 28. Another pair of horizontally extending arms 31 movably support the jaw 30 and are slidable horizontally in guideways 31a carried by the carriage 28. Limited oscillating movement of the jaws 30 and 30a about a vertical axis is provided by means of pivot pins 30b which connect the central portion of each jaw to its supporting arms. The hoist has a rigid base 32, a pair of vertically extending channel shaped guide members 33 and a rigid cap plate 34. The upper end of hydraulic cylinder 29 is anchored on the plate 34 and a piston within the hoist cylinder 29 is operatively connected to the carriage 28 by a rod 35. Antifriction rollers 33a (FIG 4) are mounted on the carriage 28 to run in the channels of the guide members 33.

Figure 11:
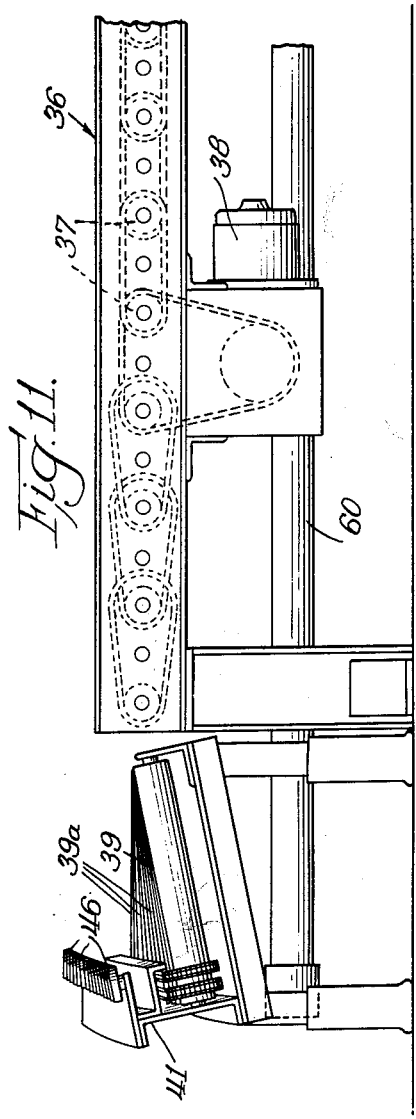
FIG. 11 is a front elevational view showing the layer receiving platform and discharge conveyor more in detail.

Extending at one side of the platform 25 and at a common elevation therewith is a second platform 36 defining a layer receiving area. As indicated in FIGS. 7 and 11, platform 36 is preferably provided with load supporting rollers 37 which are operatively connected to an electric motor 38 adapted to be energized to convey layers of articles received from the platform 25 to a row discharge conveyor indicated generally at 39. This conveyor is also of the live roller type having rollers 39a for supporting the cartons operatively connected to an electric motor 40. The load supporting rollers 39a of conveyor 39 are inclined so that the cartons received on this conveyor are tilted away from the platform 36 to contact guiding means indicated generally at 41 extending along the lower side of the discharge conveyor.

*Pusher Mechanism*

FIGS. 1–4 and 7 show mechanism suitable for transferring layers of cartons from the unstacking platform 25 to the layer receiving platform 36. This same mechanism is operative to transfer empty pallets from the platform 25 to a pallet stacking elevator 55 and includes a pusher bar 56 which is movable across the platform 25 from a starting position indicated in FIGS. 1 and 2 to an end position indicated in FIGS. 3 and 4 and back to the starting position. A pair of arms 57 are rigidly connected to the bar 56 and project between rollers of the platform 25 from a supporting carriage 58 movable along guide rails 59 positioned beneath the platform 25.

Hydraulic means are provided for actuating the carriage 58 with the required reciprocating movement along the rails 59. An elongated substantially horizontally extending cylinder 60 is suitably mounted on the machine frame beneath the platform 36 and a piston within the cylinder is connected by a rod 61 to the carriage 58. Fluid under pressure is admitted to and exhausted from opposite ends of the cylinder 60 under control of a valve 62 (FIG. 7) and solenoids 63 and 64 have plungers which are operatively connected to a valve 62 to activate the pusher mechanism when either of these solenoids is energized, as hereinafter described. When solenoid 63 is energized the valve becomes operative to admit fluid under pressure to the right end of the cylinder 60 while exhausting fluid from the left end. To reverse the movement of the pusher bar the solenoid 64 is energized, thereby exhausting fluid from the right end and admitting pressure fluid to the left end of the cylinder.

Pallet Stacking Mechanism

Figure 9:
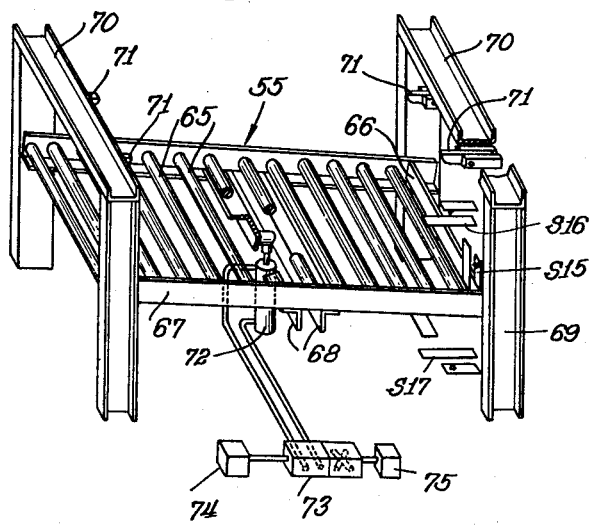
FIG. 9 is a perspective view showing the empty pallet stacking mechanism and associated limit switches with portions broken away to show parts otherwise concealed.

Pallet stacking elevator 55 has a deck defined by load supporting rollers 65 (FIG. 9) and is disposed at a slight incline so that the pallets will be carried by gravity on the rollers 65 toward a stop 66 at the end of the elevator deck remote from the unstacking platform 25. Inclined rails 67 supporting the rollers 65 are in turn supported on a pair of cross frame members 68 and are guided between vertically disposed fixed frame members 69. At their upper ends frame members 69 of each pair are connected together by horizontal members 70. Each horizontal member 70 supports a pair of spaced, pivoted dogs 71 which normally project above the elevator deck to support one or more pallets in elevated position. The several dogs 71 are free to swing upward out of the path of each pallet as it is raised on the deck rollers 65. Upon the lowering of the deck the dogs return to their horizontally projecting position wherein they support the elevated pallet or stack of pallets.

Pallet elevator 55 is movable from its lower position wherein it receives individual pallets from platform 25 to an elevated position at or slightly above the elevation of the dogs 71. As shown, hydraulic means including a vertical cylinder 72 having a piston connected to the pallet elevator is provided to raise and lower the latter. Flow of fluid under pressure to and from the upper and lower ends respectively of the cylinder 72 is under control of a valve indicated generally at 73. Solenoids 74 and 75 are provided for actuating this valve.

Hoist and Clamping Jaw Actuating Mechanism

Fluid under suitable pressure may be admitted to either end of the cylinder 29 and exhausted from the opposite end under control of a valve 76. This valve is spring biased toward a central position wherein the fluid pressure is locked in opposite ends of the cylinder 29. Solenoids 77 and 78 have plungers operatively connected to the valve 76 to actuate the hoist to move up or down to predetermined positions. When the solenoid 78 is energized, the valve is moved to such position as to cause fluid to enter the lower end of the cylinder 29 while allowing flow out of the upper end to thereby raise the hoist. When the solenoid 77 is energized the valve 76 is actuated to reverse the flow to and from the cylinder and thereby cause the hoist to move downward.

Clamping jaw 30 is also actuated by hydraulic means including a horizontally extending cylinder 79 mounted on carriage 28 and having a piston and rod 80 operatively connected to the jaw 30. A valve 81 controls the flow of pressure fluid to and from the cylinder 79. This valve is also solenoid actuated, having a solenoid 82 adapted to be energized to cause the jaw 30 to move inward to closed position and a solenoid 83 which is energized to cause the jaw to move outward to open position. Flexible fluid conduits indicated at 84 and 85 connect the valve 81 to opposite ends of the cylinder 29. Interposed in the conduit 85 is a pressure responsive switch actuating device disposed to actuate a normally open switch S11 to closed position when fluid pressure in conduit 85 reaches a value corresponding to the gripping pressure required to lift a stack of cartons in the grip of the jaws 30 and 30a.

Limit Switches Associated With Hoist and Clamping Jaws

The location of these switches is approximately as indicated diagrammatically in FIG. 8. In addition to the pressure responsive switch S11 the control circuit includes limit switches S2, S3, S5, S6, S7 and S8. Switch S2 has a contact S2a which is normally closed when the gripping jaw 30 is in its open position and a normally open contact S2b which is closed when the jaw 30 is in its closed position and in contact with cartons. Switch S2 is mounted on the jaw 30 and has an actuating pin 2c projecting through an opening in the jaw 30 as indicated in FIG. 8 for engagement with cartons at the inner side of the jaw. A normally open switch S3 is closed when jaw 30 is in its open position. This switch may be mounted as indicated on a fixed support in the path of a finger projecting from one of the arms 31 supporting the jaw 30.

Electric circuits for activating the hoist include the switches S5, S6, S7 and S8 all mounted on fixed supports along the path of the hoist carriage 28 to be actuated thereby when the hoist reaches preselected elevations. Switches S5 and S6 are normally open and are both closed when the hoist is in its top position. As the hoist starts down switch S5 opens and S6 remains closed until the hoist reaches an intermediate position allowing switch S6 to open. Switch S7 at a lower elevation has a normally closed contact S7a and a normally open contact S7b. It is closed at its normally open contact and opened at its normally closed contact when the hoist reaches the elevation of this switch. Switch S8 is normally open and is arranged to be closed when the hoist reaches the bottom limit of its movement.

Control Switches Associated With Conveyors and Pusher Mechanism

Projecting into the path of stacks of cartons on the feed conveyor 20 is a normally open switch S9 which is closed when a load or stack is placed on this conveyor. Subsequently, upon delivery of the stack to the platform 25, a switch S1 is actuated. This switch has a normally open contact S1b and a normally closed contact S1a.

Switches S10, S12 and S13 are so located as to be actuated when the pusher bar 56 reaches predetermined positions in its cycle of operation. Switch S10 has a normally closed contact S10a and a normally open contact S10b. This switch is closed at its contact S10b and opened at S10a when the pusher reaches a position near the end of its travel toward the right side of the platform. Switch S12 is normally open and so located as to be closed when the pusher bar 56 is in its end position at the left of the unstacking platform 25. Upon arrival of the pusher bar at its end position at the right hand side of the unstacking platform switch S13 is closed.

An operating control for the rollers 37 of the layer receiving platform 36 comprises a normally closed switch S14 mounted at one side of this platform and having an arm projecting into the path of the cartons. When this arm is actuated by a carton approaching conveyor 39, switch S14 is opened. Further controls for motor 38 for operating rollers 37 comprise a pair of normally closed switches S4 and S4a which are actuated to open position as each row of cartons is received on the carton delivery conveyor 39. Each of the switches S4 and S4a has an arm which projects above and slightly beyond the anti-friction wheels 46 on the guard rail 41. When either of these switches is open the operation of the motor 38 is interrupted.

Pallet Stacking Control Switches

Three switches are provided to control the operation of the stacking mechanism. These are identified as switches S15, S16 and S17 in FIGS. 9 and 10. Normally open switch S15 is closed when a pallet is delivered against the stop 66 on the elevator 55. Switch S16 is closed when the pallet elevator reaches the upper extremity of its movement to energize the down solenoid 74 and start the return of the elevator to its bottom position. Switch S17 is closed when the elevator is in its bottom or pallet receiving position. Switches S16 and S17 are supported on suitable fixed supports attached to the frame members of the pallet stacker and each has a spring arm projecting for engagement with a member of the elevator. Switch S15 is similarly mounted and has a member projecting in position to be actuated when a pallet engages the stop 66. Solenoid valve 73 is of the type which holds in either of its positions, i.e., for sending the deck 55 up or down, when actuated momentarily by either solenoid 74 or 75.

Electric Circuits

Figure 10:
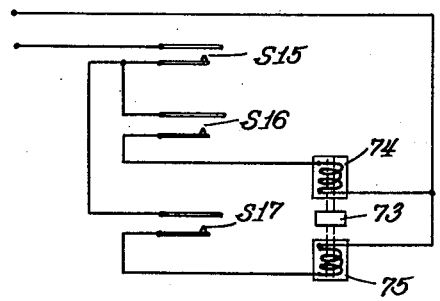
FIG. 10 is a wiring diagram showing the empty pallet stacking control circuit.

FIG. 10 shows simple circuits for energizing the solenoids 74 and 75 for actuating the valve 73 controlling the pallet hoist operation and including the limit switches S15, S16 and S17. These circuits will be readily understood without further detail explanation.

Figure 12:
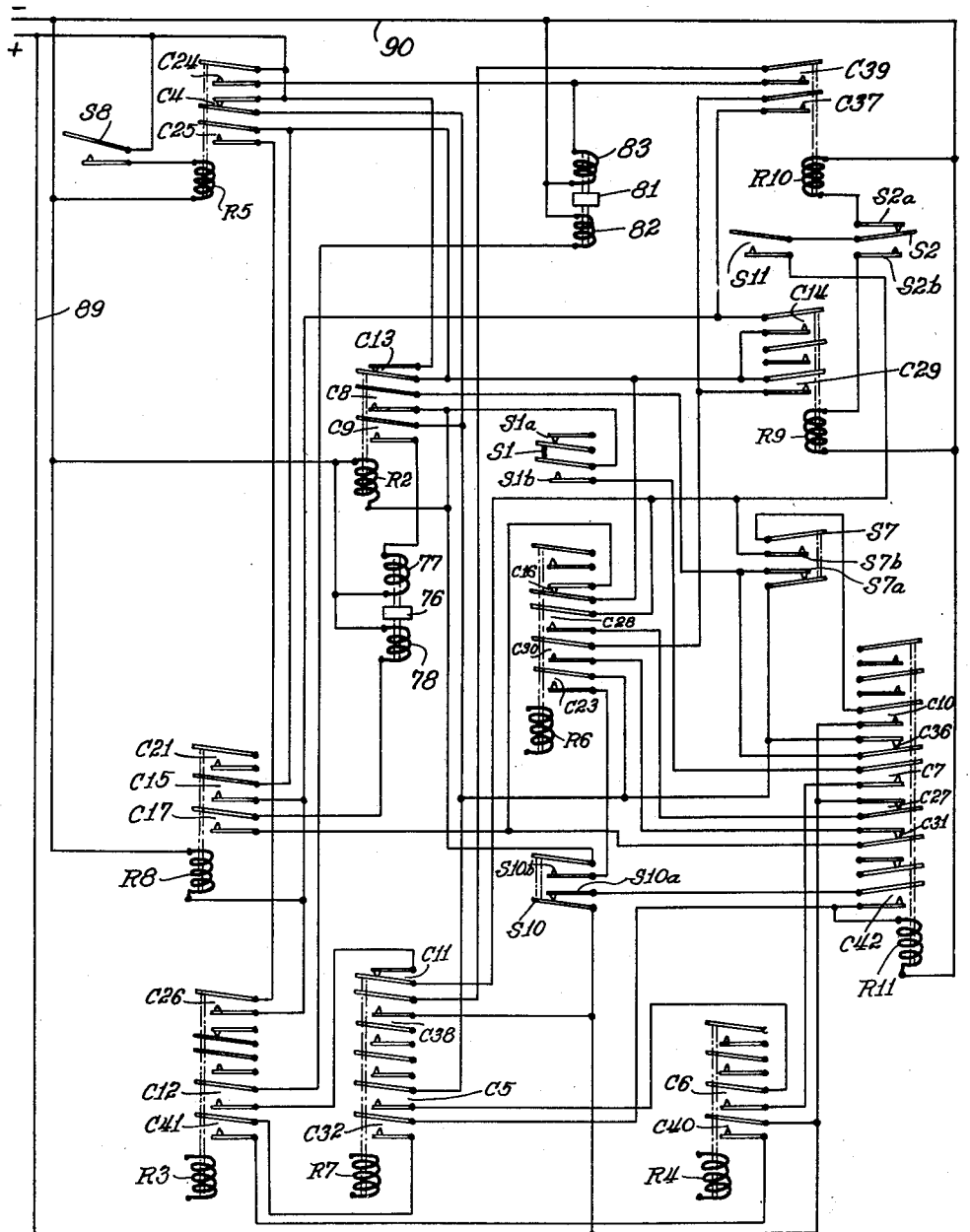
FIG. 12 is a wiring diagram showing the hoist and clamp control circuits.

In FIG. 12 I have shown circuits which are primarily related to the hoist and clamp mechanism and whereby the solenoids actuating the valves for the hoist and clamps are energized. Relays R3, R4, R6 and R7 shown in FIG. 12 have coils which are included in circuits shown in FIG. 13.

FIG. 13 shows circuits including conveyor motors 22, 38 and 40 and also for energizing solenoids 63 and 64 for operating the pusher control valve. The circuits shown in FIGS. 12 and 13 have interlocking connections. Thus in FIG. 13 relays R8, R9 and R11 have coils included in circuits shown in FIG. 12. As indicated in these wiring diagrams, each of the relays R1 to R14 inclusive has one or more pairs of armature actuated spring contacts. All relay contacts and switches are shown in their normal positions, i.e., in either open or closed circuit position, as when the several relays are deenergized. The several circuits will be best understood from a description of the operation which follows:

In these wiring diagrams current supply conductors are indicated at 89 and 90, representing the positive and negative sides of the circuits respectively.

Operation

At the start of an operating cycle feed conveyor 20 is not running, no load being positioned on this conveyor, layer pusher bar 56 is back to the left closing switch S12, the hoist is in its top position closing switches S5 and S6 and clamp jaw 30 is in its open position closing switch S3. Switch S2 is open at contact S2b and closed at S2a. As will be evident from FIG. 13, conveyor rollers 37 connected to motor 38 are operating since this motor is in series with normally closed switches S4 and S4a and there are no cartons on the discharge conveyor 39. The latter is normally in continuous operation as is the carton turning belt 42. Also at the start of a cycle relay R3 is energized through the circuit under control of closed switch S3, clamping jaw 30 being in its open position. Relay R4 is energized through its circuit under control of switch S12 which is held closed by the pusher bar when in its left position. Relay R7 (FIG. 13) is also energized, switch S5 being closed, relay R6 is energized through the circuit including closed switch S6 and relay R11 is energized and is held in through its own holding contacts and normally closed contact S10a.

Figure 2:
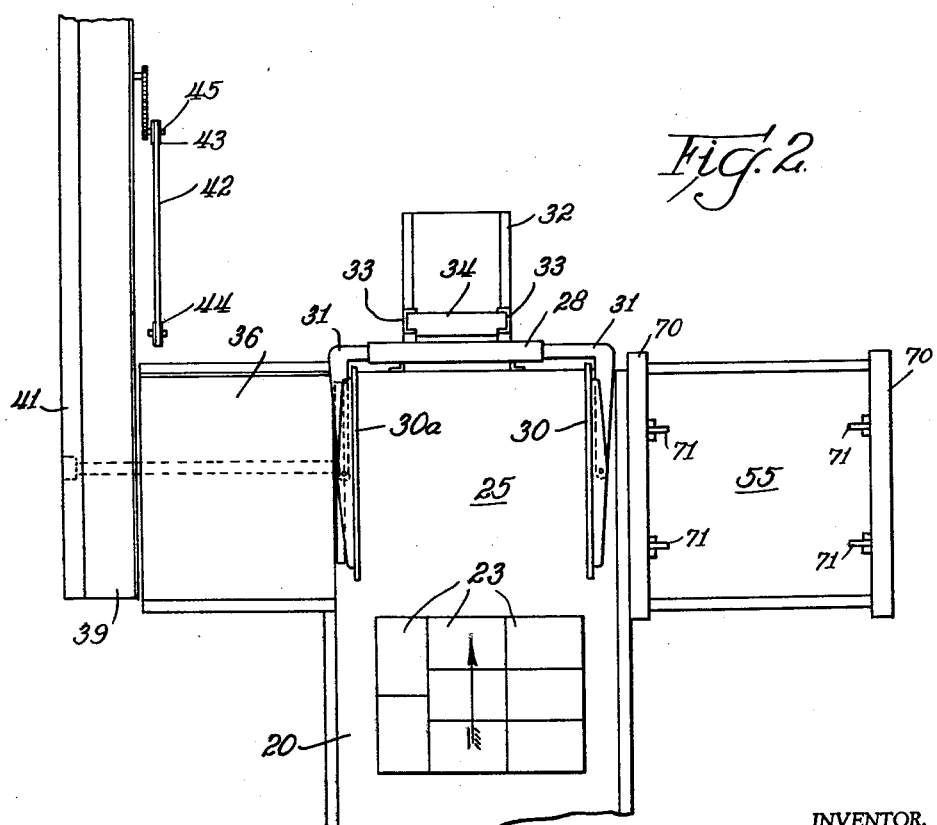
FIG. 2 is a plan view of the principal mechanical elements of the machine in the same starting position.

Assuming that the stacks of cartons to be unstacked are supported on pallets, to start a cycle a load of cartons on a pallet is placed on feed conveyor 20, as indicated in FIGS. 1 and 2, thereby closing switch S9. This switch now energizes relay R1 through the circuit from conductor 89 including contacts C1 of relay R3, contacts C2 of relay R4, contacts C3 of relay R11, contact S1a of switch S1, switch S9 and the coil of relay R1 to conductor 90. Relay R1 is now held in through its own contacts, and through a branch of this closed circuit, motor 22 of the feed conveyor is started. The load of cartons is then moved on conveyor 20 to platform 25 where switch S1 is actuated by the load. The circuit including contact S1a is thereby opened to deenergize relay R1 and stop motor 22 operating conveyor rollers 21.

At the same time a circuit is closed at contact S1b including normally closed contacts C4 of relay R5 (FIG. 12), contacts C5 of relay R7, contacts C6 of relay R4, contacts C7 of relay R11, contact S1b of switch S1 and the coil of relay R2. This relay is thereby energized and will lock in through its own contacts C8 and normally closed contact S7a of switch 7 to cause solenoid 77 to be energized through a circuit which includes contacts C4 of relay R5, contacts C9 of relay R2 and the coil of solenoid 77. Downward movement of the hoist will continue until switch S7 is actuated to open a circuit at its normally closed contact S7a. Relay R2 and solenoid 77 are thereby deenergized and downward travel of the hoist stops with the lower edges of the clamp jaws slightly above the pallet on platform 25.

Simultaneously a clamp activating circuit is closed at the normally open contact S7b of switch 7. Since relay R11 is energized this circuit includes contacts C10 of relay R11, contact S7b, contacts C11 of relay R7, contacts C12 of relay R3 and the coil of solenoid 82. Valve 81 is thereby actuated to cause the clamp jaw 30 to move to closed position. A stack of cartons above platform 25 is thereby clamped in the grip of the jaws 30, 30a. As the gripping pressure increases to the predetermined maximum in the right end of cylinder 79 and in conduit 85, pressure responsive device 86 closes switch S11. Current is now fed through contacts C10 of R11, contact S7b, switch 11, S2b contact of switch S2 and the coil of relay 9.

Upward movement of the hoist follows due to the closing of a circuit through the coil of solenoid 78 actuating hoist valve 76. This circuit includes contacts C13 of relay R2, contacts C14 of relay R9 and the coil of relay R8. Being thus energized, relay R8 is held in through its own contacts C15 and solenoid 78 is energized to cause the hoist to move up. Included in this circuit are contacts C16 of relay R6 and contacts C17 of relay R8.

The hoist then moves up to an elevation where it closes switch S6, thereby energizing relay R6 causing contacts C15 to open, and opening the circuit supplying current to the coil of solenoid 78. Upward movement of the hoist is thereby stopped when it reaches a predetermined elevation.

As a further result of the closing of switch S6, the layer pusher bar 56 is cause to move from the left side to the right side of the unstacking platform. The empty pallet 24 on this platform being in the path of the pusher bar is thereby moved to the pallet stacker elevator as indicated in FIGS. 3 and 4. To thus actuate the pusher bar, solenoid 64 is energized through a circuit shown in FIG. 13. It includes contacts C18 of relay R4, contacts C19 of relay R3, contacts C20 of relay R11, contacts C21 of relay R8, contacts C22 of relay R6 and the coil of solenoid 64. Valve 62 is thereby operated to cause the pusher to move to the right. Operation of valve 62 requires only momentary energization of its actuating solenoids 63 or 64.

Just prior to the arrival of the pusher at its extreme right position limit switch S10 is actuated to close a circuit at its contact S10b and open another circuit at its contact S10a. As indicated in FIG. 12, the opening of the circuit at S10a causes relay R11 to drop out and the closing at contact S10b completes a circuit which includes contacts C4 of relay R5, contacts C23 of relay R6, contact S10b of switch S10 and the coil of relay R2. Relay R2 is thereupon held in through its contacts C8, the holding circuit including contacts C4, S7a of switch S7 and contacts C8 and the coil of relay R2. Solenoid 77 is now energized through the circuit which includes contacts C4 of R5 and C9 of R2.

In the meantime the pusher finishes its stroke to the right and comes to rest, closing switch S13. The hoist then moves down to its bottom position where it closes switch S8 to complete a circuit including the coil of relay R5. Contacts C4 of relay R5 open to cause relay R2 to drop out, open the circuit including solenoid 77 and stop the downward travel of the hoist.

Normally open contacts C24 of relay R5 now close to energize solenoid 83 and cause clamping jaw 30 to move out to its open position indicated in broken lines in FIG. 3. When this jaw reaches its wide open position relay R3 is energized due to the closing of switch S3. Relay R8 is now energized by current fed through contacts C13 of relay R2, contacts C25 of relay R5, and contacts C26 of relay R3. Upon the closing of its contacts C15, relay R8 is locked in while the hoist moves up. Upward movement is started when solenoid 78 is energized, current being fed through contacts C13 of relay R2, contact C16 of relay R6, contacts C17 of relay R8 and solenoid 78.

Upward movement of the hoist continues until switch S6 is gain closed to energize relay R6 and open the circuit including solenoid 78, thereby stopping upward movement of the hoist. At the same time clamping jaw 30 is activated to move in to its gripping position. This clamp circuit includes contacts C27 of relay R11, contacts C28 of relay R6, contacts C11 of relay R7, C12 of R3 and solenoid 82 actuating valve 81.

Assuming that there are a plurality of layers of cartons resting on the platform 25, clamp jaw 30 will again be closed to grip all layers except the bottom layer, being activated by solenoid 82. Pin 2c actuates switch S2 to close at its contacts S2b which is in series with switch S11 and the coil of relay R9. Fluid pressure in the device 86 now increases until switch 11 is closed, causing relay R9 and solenoid 78 to be energized. The hoist carrying its load of cartons now moves up, the pertinent circuit including contacts C13 of relay R2, contacts C29 of relay R9, contacts C30 of relay R6, contacts C31 of relay R11, contacts C17 of relay R8 and solenoid 78.

Upward movement of the hoist is stopped mechanically leaving solenoid 78 energized when the hoist reaches its top position where it closes switch S5. As indicated in FIG. 13, closing this switch feeds current to energize relay R7, and activate pusher bar 56 to push a layer of cartons off of platform 25 to platform 36. The pusher bar is thus moved by energizing solenoid 63 which is included in a circuit including contacts C32 of relay R11, contacts C33 of relay R7 and switch S13 and switch S14. The free layer of cartons on the unstacking platform 25 is thereby pushed to the extreme left position of the pusher bar 56 where it closes switch 12. Solenoid 63 is now de-energized due to the opening of switch S13. It will be evident that solenoid 63 cannot be energized as long as there is a carton on platform 36 in position to hold switch S14 open.

Upon the arrival of a layer of cartons on live rollers 37 of platform 36 these rollers convey the cartons to the discharge conveyor 39, one row at a time Switches S4 and S4a are actuated to open the circuit for energizing motor 38, thereby stopping the rollers 37 momentarily as each row is delivered to conveyor 39. As hereinbefore described, the rollers of the conveyor are so operated as to accelerate and space the cartons as each of them arrives on or adjacent to the turning device comprising the belt 42. Thus the cartons are discharged along the conveyor 39 in spaced end to end relative positions irrespective of their relative position when they are received on this conveyor. When each row clears the switches S4 and S4a, another row is fed to the discharge conveyor by operation of the rollers 37 until all cartons of the layer have been discharged from the machine.

During the discharge of one layer of cartons from platform 36 another layer is deposited on the platform 25 by a repetition of the operations of the hoist and clamp mechanism and solenoid 64 for activating the pusher bar to its position at the right side of the platform. As indicated in FIG. 13, this pusher circuit includes contacts C13 of relay R4, contacts C34 of relay R7, contacts C35 of relay R9 and solenoid 64. The hoist with its load starts down again when the pusher mechanism closes switch S10 at its contact S10b thereby closing the circuit including contacts C4 of relay R5, contacts C23 of relay R6, contacts S10b of switch S10 and the coil of relay R2. Again this relay is locked in through its contacts C8. The holding circuit for relay R2 now includes contact C4 of relay R5, contacts C36 of relay R11 and contacts C8 of relay R2. Switch S8 is actuated by the hoist when it reaches its bottom position to open the circuit at contacts C4 of relay R5 feeding relay R2. This relay and solenoid 77 are thereby deenergized and the hoist stops in a position to deposit another layer of cartons on the platform 25. This layer is released from the clamping jaws when contacts S24 of relay R5 feed current to solenoid 83 causing the clamp jaw 30 to move out.

Upward movement to a position determined by the elevation of switch S6 follows when switch S3 is closed to energize relay R3. Contacts C26 of relay R3 then close a circuit including contacts S13 of relay R2, C25 of R5, C26 of R3 and the coil of relay R8. Contacts C17 of relay R8 then close a circuit including solenoid 78 causing the hoist to move up. Relay R8 is held in through its contacts C15, and the circuit including contacts C13 of R2 and solenoid 78 is energized through the branch circuit including contact C16 of relay R6 and contacts C17 of relay R8.

The closing of switch S6 energizes relay R6 to stop upward movement of the hoist and to cause clamp jaw 30 to move in to grip the layer or layers resting on the bottom layer. As hereinbefore pointed out, this clamping circuit includes contacts C27 of relay R11, C28 of R6, C11 of R7 and C13 of R3 and solenoid 82. With one or more layers of cartons in the grip of the jaws 30, 30a, the hoist now moves up to its top position. Relay R9 being energized by the closing of switch S11 and contact S2b, solenoid 78 is energized again through the circuit including contact C13 of relay R2, C29 of R9, C30 of R6, C31 of R11 and C17 of R8 to cause the hoist to move up. This frees the layer remaining on the platform 25 so that this layer is discharged as in the case of the first layer. Upon reaching its top position the hoist is stopped mechanically, closes switch S5 and switch S6 remains closed.

The hoist carrying its load of cartons from its top position moves down when solenoid 77 and relay R2 are energized. This relay is energized upon the closing of contact S10b of switch S10, the circuit including normally closed contact C4 of relay R5 and contacts C26 of relay R6. Solenoid 77 is now energized by current fed through contact C4 of relay R5 and contact C9 of relay R2. There upon the operation of the hoist, clamp and pusher bar is repeated, as described, until the last layer of the stack has been deposited and the hoist goes up to its position where it closes switch S6. Assuming that there are no cartons between the jaws when they are closed, switch S2 remains closed at its contact S2a and pressure actuated switch S11 is closed by fluid pressure in conduit 85 and device 86 which builds up when the piston in cylinder 79 reaches the end of its stroke to the left. Relay R10 is thereby energized to by-pass the contacts of relay R9. The circuit for energizing relay R10 includes contacts 27 of relay R11, C28 of R6, switch S11 and switch S2, contact S2a. Relay R8 remains energized by current fed through contacts C13 of R2, and holding contacts C15. Solenoid 78 is now energized by current fed through contacts C13 of R2, C15 of R8, C37 of R10, C30 of R6, C31 of R11 and C17 of R8, causing the hoist to move up to switch S5. This switch now closes the circuit including contacts C39 of relay R10 and solenoid 83, causing the jaw 30 to move out to close switch S3, activating relay R3.

Pusher bar 56 having removed the last layer of cartons from platform 25, stops in position to close switch S12 and the circuit energizing relay R4. Relays R4, R3 and R7 are now energized to complete a circuit including contacts C40 of relay R4, C31 of R3, C32 of R7, C42 of R11 and the coil of relay R11. This completes a cycle and resets the several circuits to repeat the cycle when stack of cartons is delivered to feed conveyor 20 in position to close switch S9.

*Summary of Hoist and Clamp Cycle*

(1) Starting with the hoist in its top position where it closes switch S5 and with the clamp jaws open, the hoist moves down to switch S7 where the clamps close on all cartons above the pallet.

(2) With a complete stack of cartons in the grip of the jaws, the hoist moves up to switch S6 at which time the pusher bar 56 is actuated to transfer the empty pallet from platform 25 to pallet elevator 55.

(3) The hoist moves down to its bottom position, closing switch S8, where the clamp jaws open to deposit the load of cartons on platform 25.

(4) With the clamp jaws open the hoist moves up to switch S6 where the jaws close on all layers of cartons above the bottom layer.

(5) The hoist lifts its load to the top position, closing switch S5. This activates the pusher bar to transfer the bottom layer of cartons from platform 25 to platform 36.

(6) Then, moving down to its bottom position, the hoist deposits its remaining load on platform 25 and the clamp jaws open.

Operations (4), (5) and (6) are thereupon repeated until the last layer has been deposited on platform 25 and the hoist moves up to switch S6 with the clamp jaws open.

(7) The clamp jaws close at the elevation of switch S6, but with no layer between the jaws, switch S2 remains open at its contact S2b and closed at S2a. This causes the hoist to move up to switch S5, where it stops and the jaws open ready to start a new cycle when another stack is fed to conveyor 20 in position to close switch S9.

*Modification for Operation Without Pallets*

To adapt my machine to receive stacks which are not supported on pallets only two simple modifications are required. For such operation the pallet stacking elevator 55 may be eliminated and limit switch S7 is merely moved down to a position which insures a firm grip on all layers of a stack but at an elevation slightly above the bottom position of the hoist where switch S8 is closed. Thus, during each cycle of operation the first time the hoist starts down from its top position with the clamp jaws open it will stop at the elevation of switch S7, slightly above switch S8. At this elevation the clamping jaws and hoist pick up all layers, move up to switch S6 and stop as described. The pusher bar or ram moves to its right position where it stops also as described. No other modification is required in the activating means for completing the automatic operation through the cycle hereinbefore described in detail.

Other modifications of the invention may be made within the scope of the appended claims.

The present application is a division of my application Serial No. 686,431, filed September 26, 1957, for Carton Unstacking Machine.

I claim:

1. A carton unstacking machine adapted to receive a succession of stacks of cartons, each stack containing a plurality of layers composed of one or more rows of cartons, comprising: a first platform defining an unstacking area, a second platform defining a layer receiving area at one side of said first platform; a hoist associated with said first platform including a supporting frame, a vertically reciprocable carriage mounted on said frame, first power actuated means for raising and lowering said carriage on said frame, a pair of clamping jaws positioned on said carriage to engage opposite sides of layers of cartons on said first platform, second power actuated means for moving said clamping jaws into and out of engagement with the carton layers; control means for sequentially energizing said second power actuated means to cause said clamping jaws to clamp carton layers composed of a plurality of cartons above a bottom layer, then energizing said first power means to lift said layers to a predetermined elevation and thereafter lower said layers to said first platform, and layer moving means disposed to transfer cartons from said first platform to said second platform when the cartons of the upper layer or layers of each stack are in said predetermined elevated position on said hoist, whereby the successive bottom layers of articles are transferred laterally from said first platform to said second platform.

2. A machine in accordance with claim 1 wherein said first power actuated means and second power actuated means each comprise fluid pressure responsive means, and valves severally controlling the operation of said fluid pressure responsive means; and said control means including electro-magnetic means for actuating the several valves, limit switches disposed to be actuated by said carriage and clamping jaws when in pre-determined positions and electric circuit means for energizing the electro-magnetic means under control of said limit switches.

3. A machine in accordance with claim 1 in which said layer moving means comprises a bar projecting above the upper surface of said first platform and disposed to slide the layers successively to said second platform and means for imparting reciprocating movement to said bar from one side of said first platform to the other side of said platform.

4. A carton unstacking machine in accordance with claim 1, in which said control means includes interlocking electric circuits, electro magnetic means in said circuits for activating said first and second power means, and limit switches included in said circuits and disposed to be actuated by said carriage, clamping jaws and layer moving means respectively at predetermined positions of the same.

5. A machine in accordance with claim 4 in which said control means include electrical activating means for said layer moving means, interlocking circuits and limit switches for activating said layer moving means in timed relation to the operation of said carriage and stack clamping jaws.

6. A machine in accordance with claim 4 in which said control means include, a first normally open switch disposed to be closed when the carriage is in a top position, an electric circuit including means under control of said first switch for energizing said layer moving means, a second normally open switch disposed to be closed when the carriage is in a stack gripping position at an intermediate elevation above the bottom layer of cartons resting on said first platform, an electric circuit including means under control of said second switch for stopping downward movement of the carriage at said intermediate elevation, a third normally open switch disposed to be closed when the carriage is in a bottom position wherein the bottom layer of cartons resting on said first platform may be released by said clamping jaws, and a circuit including means under control of said third switch for stopping downward movement of the carriage when in said bottom position.

7. A machine in accordance with claim 6 in which said control means include means for activating said second power actuated means to move said clamping jaws to open position under control of said third switch, a fourth normally open switch disposed to be closed when said clamping jaws are in open position, and a circuit including means for activating said clamping jaws to closed position when said second and fourth switches are closed.

8. A machine in accordance with claim 6 in which at least one of said stack clamping jaws is movable between an open position and a closed gripping position, and said control means include, a fourth normally open switch disposed to be closed when the jaw is in open position, a circuit including means adapted to be energized when said second and fourth switches are closed for activating said second power actuated means to move said jaw to closed position, a circuit including means energized when said third switch is closed for activating said second power actuated means to move said jaw to open position, a fifth normally open switch disposed to be closed when said jaw is in carton gripping position, a sixth normally open switch disposed to be closed by said layer moving means when in a predetermined position, a circuit including means energized when said fifth and sixth switches are closed for activating said first power actuated means to move said carriage downwardly, and a circuit including means energized when said second and fifth switches are closed for activating said first power actuated means to move said carriage upwardly.

9. In a carton unstacking machine adapted to receive a succession of stacks of cartons, each stack containing a plurality of layers composed of one or more rows of cartons, a platform defining an unstacking area, a hoist associated with said platform, and including a vertically movable clamp mounting carriage, power actuated means for raising and lowering said carriage, a pair of substantially parallel, horizontally spaced clamping jaws attached to said carriage and having vertically disposed gripping surfaces adapted to frictionally engage opposite sides respectively of a plurality of carton layers each composed of a plurality of cartons, power actuated means for moving at least one of said clamping jaws toward and away from the other clamping jaw, control means for sequentially actuating both of said power actuated means to cause said clamping jaws to clamp layers of cartons above a bottom layer on said platform, lift said layers above said bottom layer by actuating said power means to lift said carriage and thereafter lower said layers to said first platform, release said layers and repeat the cycle as required, and power actuated means for removing the bottom carton layer from said platform in timed relation to the lifting of the layers above.

References Cited in the file of this patent
UNITED STATES PATENTS

| | | |
|---|---|---|
| 548,056 | Hewitt | Oct. 15, 1895 |
| 1,330,639 | Leumann | Feb. 10, 1920 |
| 2,211,511 | Melzer et al. | Aug. 13, 1940 |
| 2,536,151 | Backofen | Jan. 2, 1951 |
| 2,599,262 | Kvederis | June 3, 1952 |
| 2,701,650 | Stevenson | Feb. 8, 1955 |
| 2,702,132 | Van Doran | Feb. 15, 1955 |
| 2,702,646 | Van Doran | Feb. 22, 1955 |
| 2,731,131 | Shannon | Jan. 17, 1956 |
| 2,769,570 | Adams | Nov. 6, 1956 |
| 2,885,111 | Vann et al. | May 5, 1959 |
| 2,890,807 | Parcell | June 16, 1959 |